US012225349B1

(12) United States Patent
Zhou

(10) Patent No.: US 12,225,349 B1
(45) Date of Patent: Feb. 11, 2025

(54) NONLINEAR DISTORTION COMPENSATION FOR CAPACITIVE MEMS MICROPHONES

(71) Applicant: Meta Platforms Technologies, LLC, Menlo Park, CA (US)

(72) Inventor: Limin Zhou, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 109 days.

(21) Appl. No.: 17/967,869

(22) Filed: Oct. 17, 2022

Related U.S. Application Data

(60) Provisional application No. 63/292,085, filed on Dec. 21, 2021.

(51) Int. Cl.
*H04R 19/04* (2006.01)

(52) U.S. Cl.
CPC ....... *H04R 19/04* (2013.01); *H04R 2201/003* (2013.01)

(58) Field of Classification Search
CPC H04R 19/04; H04R 2201/003; H04R 19/005; H04R 19/016; H04R 17/02; H04R 17/025
See application file for complete search history.

(56) References Cited

U.S. PATENT DOCUMENTS 6,466,682 B2 10/2002 An
6,839,443 B2 1/2005 Fukuda
9,743,205 B2 8/2017 Stetson
9,820,035 B2 11/2017 Dominijanni et al.
9,980,069 B2 5/2018 Hartwell
(Continued)

FOREIGN PATENT DOCUMENTS

EP 2429217 A1 3/2012
EP 3734988 A1 11/2020

OTHER PUBLICATIONS

Analog Devices, "High Performance, Low Noise Studio Microphone with MEMS Microphones, Analog Beamforming, and Power Management," Application Note AN-1328, 2014, 9 pages, Retrieved from the Internet: URL: https://www.analog.com/media/en/technical-documentation/application-notes/an-1328.pdf.
(Continued)

*Primary Examiner* — Kile O Blair
(74) *Attorney, Agent, or Firm* — Potomac Law Group, PLLC; Dannon G. Allbee

(57) ABSTRACT

Embodiments relate to systems and methods for compensating nonlinear distortions. The system receives a signal corresponding to an input sound pressure which is detected by a capacitive MEMS microphone. The capacitive MEMS microphone includes an active capacitance and a parasitic capacitance. The system determines a nonlinear relationship between the signal and the input sound pressure; and determines, based on the signal, an input parameter associated with the active capacitance and the parasitic capacitance. The system further determines an output signal based on the input parameter and the output signal and the input sound pressure have a linear relationship. The system compensates the signal based on the determined output signal and outputs the compensated signal as an output so that the output has the linear relationship with the input sound pressure.

20 Claims, 8 Drawing Sheets

(56) References Cited

U.S. PATENT DOCUMENTS

| | | | |
|---|---|---|---|
| 10,327,083 B2 | 6/2019 | Rusconi Clerici Beltrami et al. | |
| 10,351,419 B2 | 7/2019 | Gao et al. | |
| 10,812,900 B2 | 10/2020 | Khenkin et al. | |
| 2011/0274308 A1 | 11/2011 | Doh et al. | |
| 2014/0266260 A1* | 9/2014 | Wurzinger | G01R 27/2605 702/65 |
| 2024/0236556 A1 | 7/2024 | Silver | |
| 2024/0284096 A1 | 8/2024 | Silver | |
| 2024/0292136 A1 | 8/2024 | Silver et al. | |

OTHER PUBLICATIONS

Johnson R.C., "MEMS Mics Taking Over," EE Times, Dec. 2, 2014, 2 pages, Retrieved from the Internet: URL: https://www.eetimes.com/mems-mics-taking-over/.

Martin D.T., "Design, Fabrication, and Characterization of a MEMS Dual-Backplate Capacitive Microphone," University of Florida, 2007, 250 pages, Retrieved from the Internet: URL: http://ufdcimages.uflib.ufl.edu/UF/E0/01/75/26/00001/martin_d.pdf.

ST Application Note, "Tutorial for MEMS Microphones," Mechanical Specifications, Construction details, Feb. 2017, 20 pages, Retrieved from the Internet: URL: https://www.st.com/resource/en/application_note/dm00103199-tutorial-for-mems-microphones-stmicroelectronics.pdf.

* cited by examiner

NONLINEAR DISTORTION COMPENSATION FOR CAPACITIVE MEMS MICROPHONES

CROSS-REFERENCE TO RELATED APPLICATIONS

This application claims the benefit of U.S. Provisional Application No. 63/292,085, filed Dec. 21, 2021, which is incorporated by reference in its entirety.

FIELD OF THE INVENTION

This disclosure relates generally to nonlinear distortion compensation, and more specifically to nonlinear distortion compensation for capacitive microelectromechanical systems (MEMS) microphones.

BACKGROUND

MEMS (microelectromechanical systems) microphones are micro-scale devices that provide high fidelity acoustic sensing and are small enough to be included in a tightly-integrated electronic product. They can be found in smartphones and other consumer products. Nowadays, MEMS microphones are not only used to record plain ambient sound, but they support stereo capabilities, active noise cancellation, directivity (through beam forming), voice recognition and other capabilities. The large range of uses for MEMS microphones has created substantial demand for these high-performance devices.

Capacitive MEMS microphones may be used in various audio devices. These types of microphones typically are of a single diaphragm design and have an acoustic overload point (AOP) around 120 dB and has 10% distortion. But the AOP for various audio systems is typically not enough for loud events such as music concerts and aviation shows. And for loud events, the high sound pressure can distort the microphone output and therefore reduce audio fidelity.

SUMMARY

An audio system that applies nonlinear distortion compensation for high AOP microphones is described herein. The audio system determines a received signal that has a nonlinear relationship with the input acoustic pressure and compensates the received signal for the nonlinearity introduced by the parasitic capacitance.

Embodiments of the present disclosure relate to a method for compensating nonlinear distortions. The method includes receiving a signal corresponding to an input sound pressure which is detected by a capacitive microelectromechanical system (MEMS) microphone. The capacitive MEMS microphone includes an active capacitance and a parasitic capacitance. The method includes determining that a nonlinear relationship exists between the signal and the input sound pressure; determining, based on the signal, an input parameter associated with the active capacitance and the parasitic capacitance; and determining an output signal based on the input parameter. Here, the output signal and the input sound pressure have a linear relationship. The method further includes compensating the signal based on the determined output signal so that the compensated signal has the linear relationship with the input sound pressure; and outputting the compensated signal as an output corresponding to the input sound pressure.

Embodiments of the present disclosure also relate to a non-transitory computer-readable storage medium for compensating nonlinear distortions. The non-transitory computer-readable storage medium includes stored instructions. The instruction when executed by a processor of a device, cause the device to receive a signal corresponding to an input sound pressure detected by a capacitive MEMS microphone. The capacitive MEMS microphone includes an active capacitance and a parasitic capacitance. The instruction may cause the device to determine that a nonlinear relationship exists between the signal and the input sound pressure; determine, based on the signal, an input parameter associated with the active capacitance and the parasitic capacitance; determine an output signal based on the input parameter; compensate the signal based on the determined output signal so that the compensated signal has the linear relationship with the input sound pressure; and output the compensated signal as an output corresponding to the input sound pressure.

Embodiments of the present disclosure further relate to an audio system. The audio system may include a capacitive MEMS microphone, a controller and a speaker. The capacitive MEMS microphone may include an active capacitance and a parasitic capacitance, and is configured to receive a signal corresponding to an input sound pressure. The controller is configured to determine that a nonlinear relationship exists between the signal and the input sound pressure; determine, based on the signal, a normalized displacement of a movable electrode in the active capacitance corresponding to the input sound pressure; determine an output signal based on the normalized displacement; and compensate the signal based on the determined output signal so that the compensated signal has the linear relationship with the input sound pressure. The speaker is configured to output the compensated signal as an output corresponding to the input sound pressure.

Figure 1A:
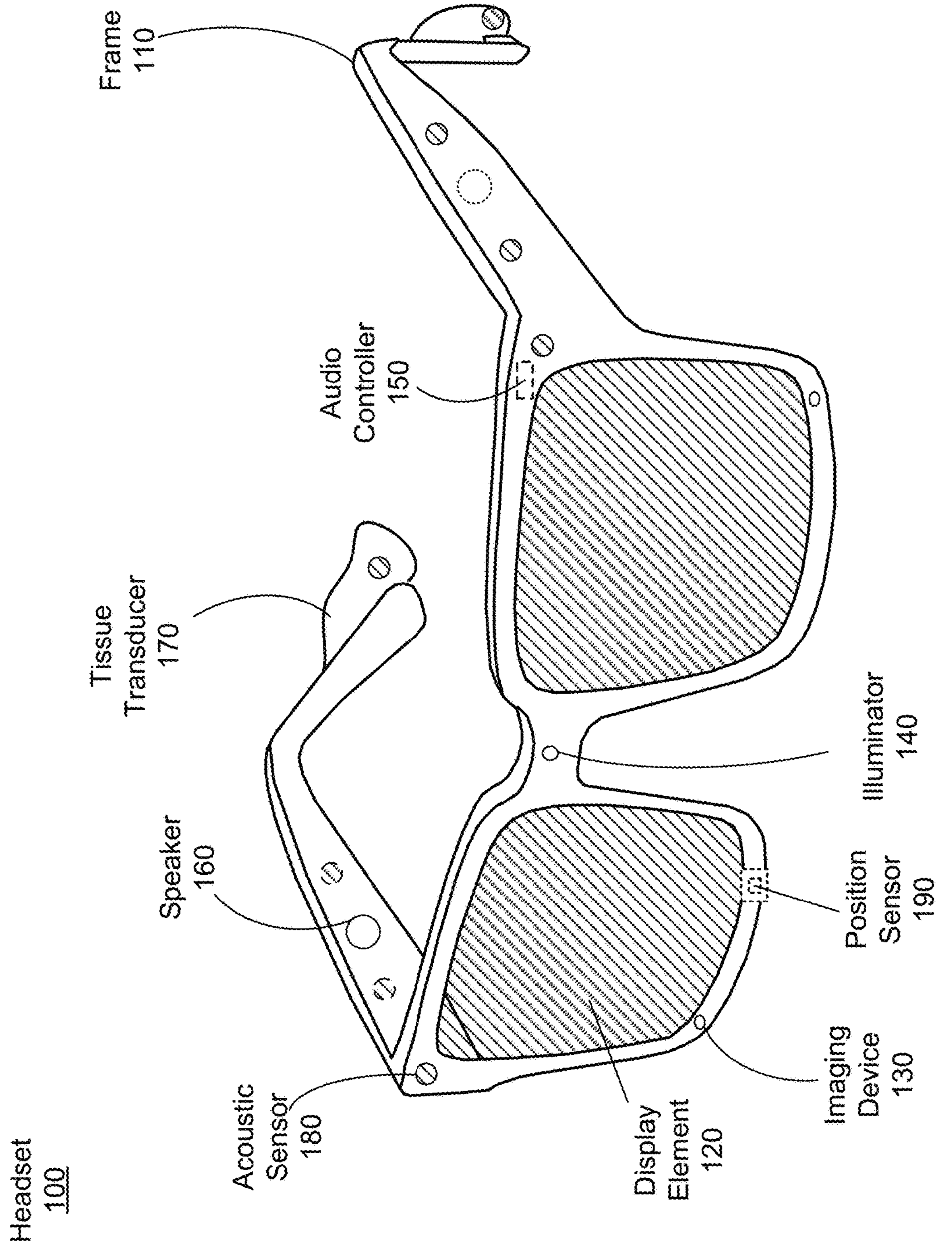
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

There are various factors (e.g., signal clipping due to bias limit, nonlinear deformation of membrane, and parasitic capacitance) that contribute to nonlinearity in input signals received by capacitive MEMS microphones. Note that the major root cause of generating high distortion below clipping is that the capacitive MEMS microphones inevitably have parasitic capacitance which results in nonlinear electrostatic force once biased.

Conventional and MEMS-based microphones are often capacitive MEMS microphones that sense acoustic waves using a flexible membrane. The membrane moves under pressure induced by acoustic waves. As the membrane moves, the capacitance between the moving membrane and the fixed backplate change (since the distance between them changes), and this change in electrical response can be analyzed and recorded. Parasitic capacitance is an unavoidable and usually unwanted capacitance that exists between the parts of an electronic component or circuit simply because of their proximity to each other. When two electrical conductors at different voltages are close together, the electric field between them causes electric charge to be stored on them; this effect is capacitance. Parasitic capacitance is a significant problem in high-frequency circuits and is often the factor limiting the operating frequency and bandwidth of electronic components and circuits. Parasitic capacitance contributes to nonlinearity in input signals received by capacitive MEMS microphones. An audio system that applies nonlinear distortion compensation for capacitive MEMS microphones is described herein.

Embodiments presented herein relate to a system and method for compensating nonlinear distortions. The system receives a signal corresponding to an input sound pressure which is detected by a capacitive MEMS microphone. The capacitive MEMS microphone includes an active capacitance and a parasitic capacitance. The system first determines whether there is a nonlinear relationship between the signal and the input sound pressure. If there is a nonlinear relationship, the system determines, based on the signal, an input parameter associated with the active capacitance and the parasitic capacitance. The system further determines an output signal based on the input parameter. Here, the output signal and the input sound pressure have a linear relationship. The system then compensates the signal based on the determined output signal and outputs the compensated signal as an output so that the sound output has a linear relationship with the input sound pressure. If the system determines there is no nonlinear relationship between the signal and the input sound pressure, the system may directly output the signal as the output corresponding to the input sound pressure.

In some embodiments, the system for compensating nonlinear distortions may be an integrated device and can be further integrated as part of an audio system. The nonlinear distortion compensation system may include the capacitive MEMS microphone. The MEMS microphone may include a MEMS transducer that is integrated with a nonlinear filter to form the nonlinear distortion compensation system. Alternatively, the nonlinear distortion compensation system may include an audio digital signal processor (DSP) for compensating nonlinear distortions, which is external to the MEMS microphone.

The audio system presented herein determines a received signal that has a nonlinear relationship with the input acoustic pressure and compensates the received signal for the nonlinearity introduced by the parasitic capacitance. In this way, the nonlinear distortion in a capacitive MEMS microphone can be compensated, thus improving the AOP for the audio system.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, earpiece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 include one or more microphones. In some embodiments, the acoustic sensors 180 may further include acoustic wave sensors, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof. The audio controller 150 may be configured to determine a sound level of the detected signal. If the sound level is higher than a threshold value, the audio controller 150 may determine that a nonlinear relationship exists between the signal and the sound pressure.

The acoustic sensors 180 include a MEMS microphone that is coupled with an audio system (e.g., headset 100) for compensating nonlinear distortions (e.g., as described below with regards to FIGS. 3-6). The MEMS microphone is configured to detect an input sound pressure and produces a corresponding signal. The audio controller 150 determines whether there is a nonlinear relationship between the signal and the input sound pressure. If there is a nonlinear relationship, the audio system then determines an output signal by compensating the signal so that the output signal has a linear relationship with the input sound pressure. In some embodiments, the MEMS microphone includes a MEMS transducer that is integrated with the audio system for compensating nonlinear distortions. The acoustic sensor 180 includes the integrated MEMS microphone, receiving an input sound pressure and outputting a signal that has a linear relationship with the input sound pressure.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 7.

Figure 1B:
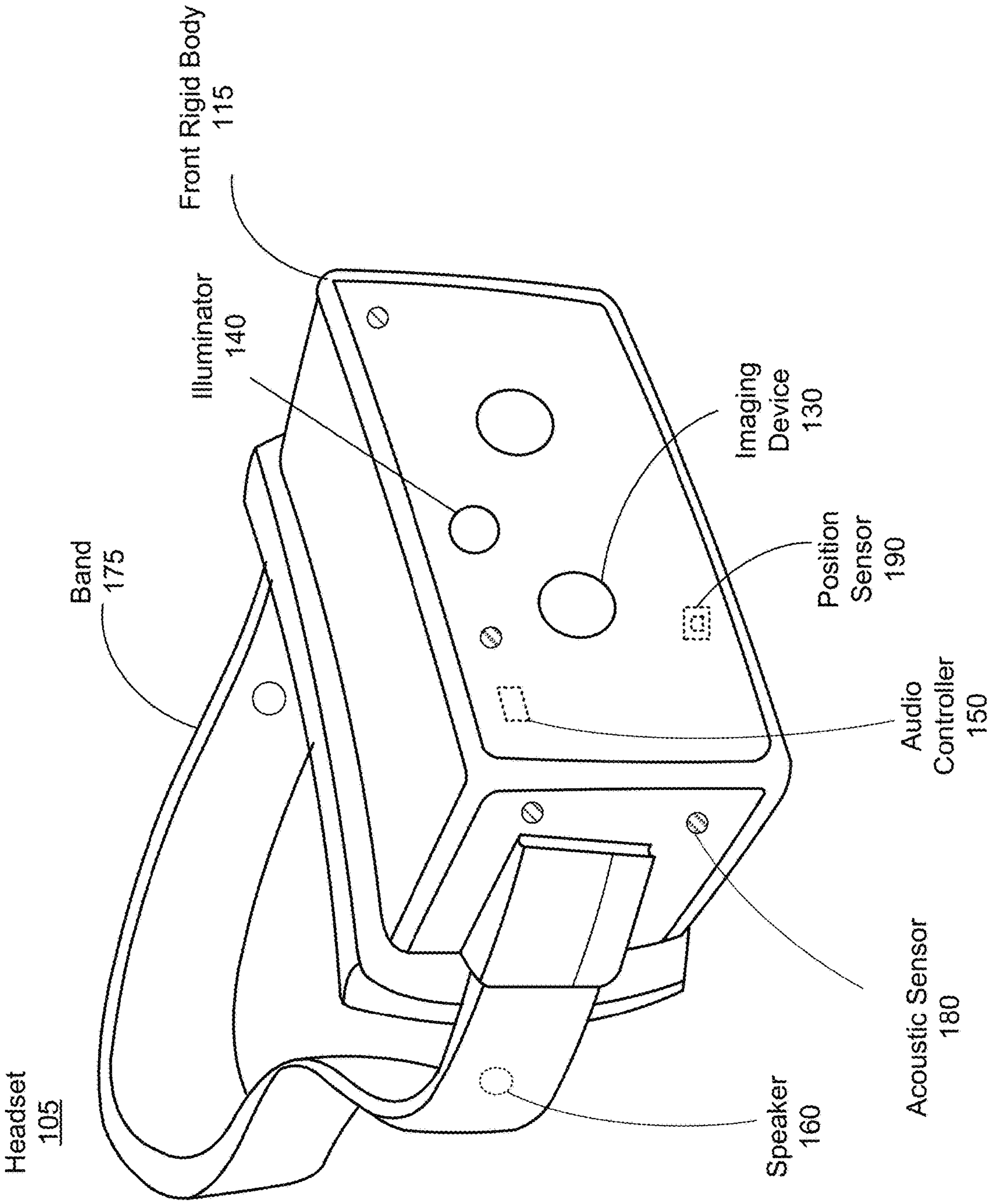
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user. The acoustic sensors 180 include a MEMS microphone that is coupled with an audio system (e.g., headset 105) for compensating nonlinear distortions (e.g., as described below with regards to FIGS. 3-6).

Figure 2:
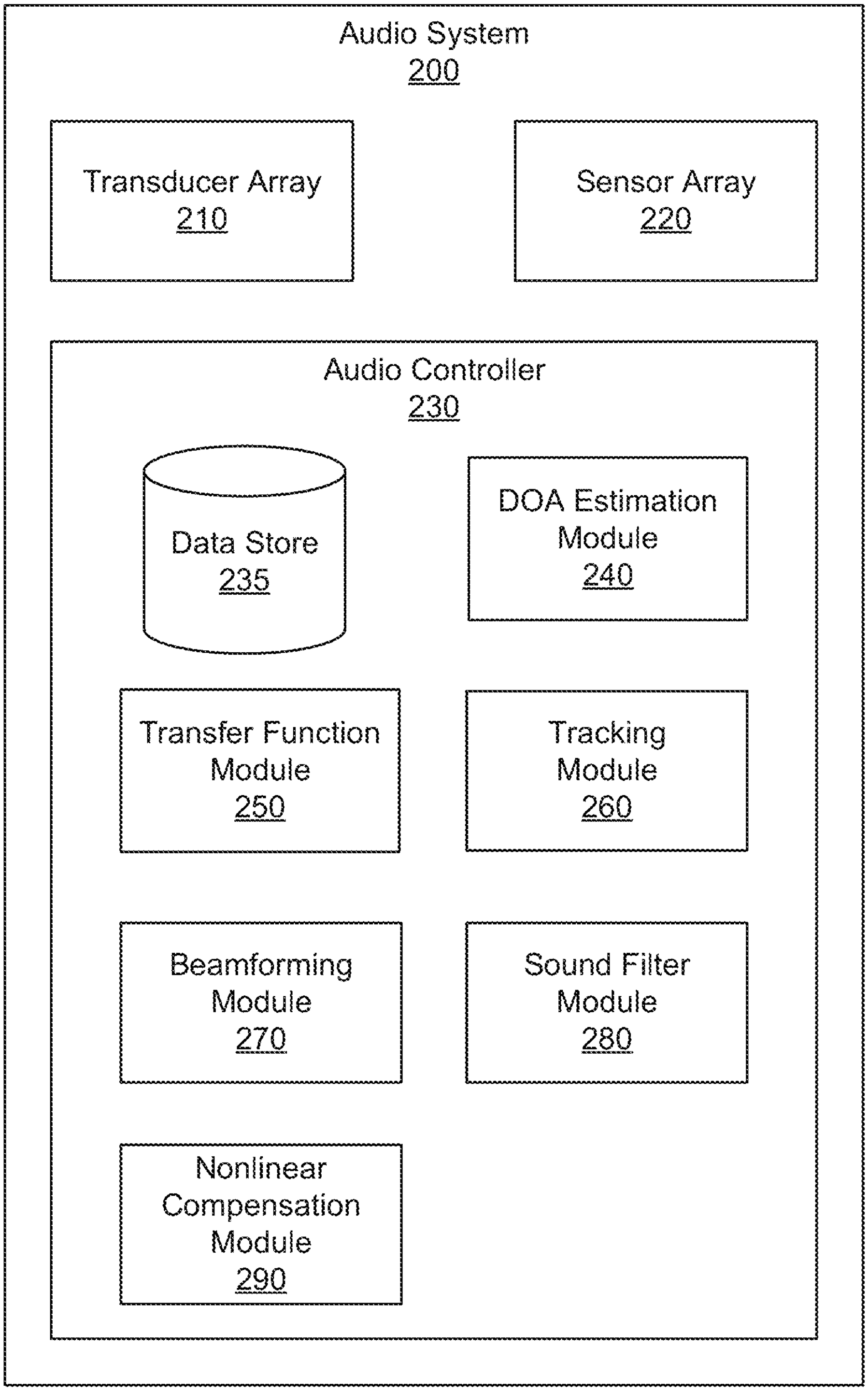
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. The audio controller 230 includes a nonlinear compensation module 290 for compensating nonlinear distortions in the detected signals. Some embodiments of the audio system 200 have different components than those described here. Similarly, in some cases, functions can be distributed among the components in a different manner than is described here.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor includes a microphone. In some embodiments, the acoustic sensor may further include a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, a sound filter module 280, and a nonlinear compensation module 290. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data. The audio controller 230 may be configured to determine a sound level of the detected signal. If the sound level is higher than a threshold value, the audio controller 230 may determine that a nonlinear relationship exists between the signal and the sound pressure. The audio controller determines, based on the received signal, an output signal which has a linear relationship with the sound pressure.

The sensor array 220 includes a MEMS microphone that is coupled with the audio system 200 for compensating nonlinear distortions (e.g., as described below with regards to FIGS. 3-6). The MEMS microphone is configured to detect an audio input sound pressure and produces a corresponding signal. The audio controller 230 determines whether there is a nonlinear relationship exists between the signal and the input sound pressure. If there is a nonlinear relationship, the nonlinear compensation module 290 then compensates the signal so that the output signal has a linear relationship with the input sound pressure. In some embodiments, the MEMS microphone includes a MEMS transducer that is integrated with the audio system 200 for compensating nonlinear distortions. The sensor array 220 includes the integrated MEMS microphone, receiving an audio input sound pressure and outputting.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, physical parameters and/or constants of the MEMS microphone (e.g., an area of the movable electrode, an impedance in the active capacitance, etc., as described below with regards to FIG. 4), and other data relevant for use by the audio system 200, or any combination thereof.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 7).

The sound filter module 280 provides the sound filters to the transducer array 210. In some embodiments, the sound filters may cause positive or negative amplification of sounds as a function of frequency.

The nonlinear compensation module 290 determines an output signal for compensating the signal so that the compensated signal has a linear relationship with the input sound pressure. Based on the received signal, the nonlinear compensation module 290 determines an input parameter associated with the active capacitance and the parasitic capacitance of the MEMS microphone and uses the determined input parameter to determine the output signal based on the input parameter. In this way, the output signal and the input sound pressure resume a linear relationship (e.g., as described below with regards to FIGS. 3-6).

The audio system presented herein determines a received signal that has a nonlinear relationship with the input acoustic pressure and compensates the received signal for the nonlinearity introduced by the parasitic capacitance in a capacitive MEMS microphone. In this way, the nonlinear distortion in the capacitive MEMS microphone can be compensated, thus improving the AOP for the audio system.

Figure 3:
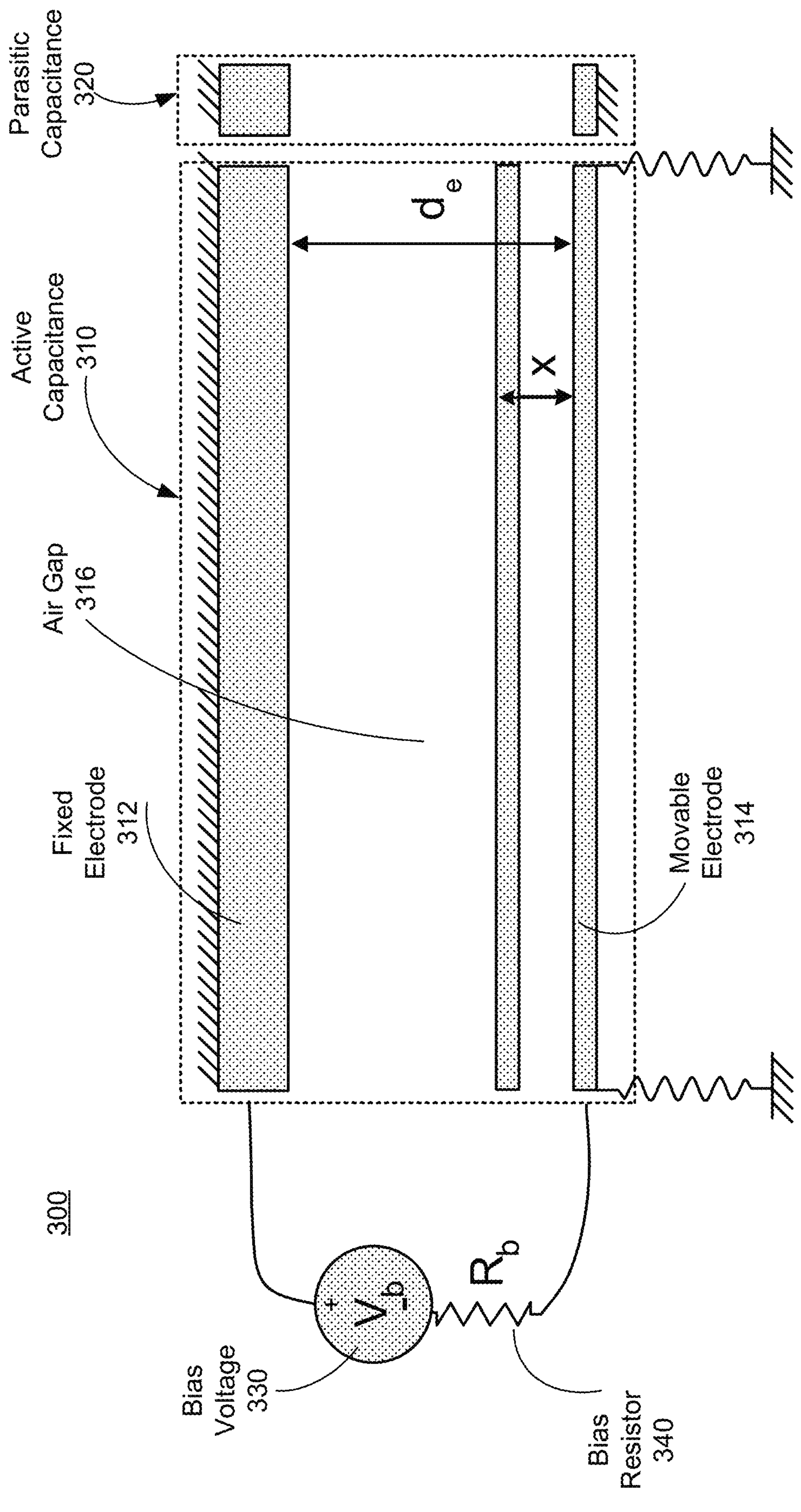
FIG. 3 illustrates an example capacitance in a MEMS microphone system, in accordance with one or more embodiments.

FIG. 3 illustrates an example capacitance in a MEMS microphone system 300, in accordance with one or more embodiments. The capacitance may include an active capacitance 310, i.e., $C_e$, and a parasitic capacitance 320, i.e., $C_p$. The active capacitance 310 may include a fixed electrode 312 (e.g., backplate) and a movable electrode 314 (e.g., membrane) and an air gap 316 between the two electrodes 312 and 314. The distance of the air gap 316 at the equilibrium under bias is $d_e$. The active capacitance 310 may be operated under a constant charge mode, with a bias voltage 330, i.e., $V_b$ and a bias resistor 340, i.e., $R_b$. In an ideal situation, the MEMS microphone system 300 may only include the active capacitance 310. A sound pressure p caused by an acoustic wave applied on the movable electrode 314 is directly proportional to the displacement x of the movable electrode 314. The microphone system generates a signal in response to the sound pressure. In some embodiments, the signal is a voltage signal v. A signal v that is output by the ideal microphone system is directly proportional to the displacement of the movable electrode 314, which can be presented in the following manner:

$$v=-\beta V_b, \tag{1}$$

where $V_b$ is the bias voltage 330 on $C_e$, and β is a normalized displacement of the movable electrode 314, which is a ratio of displacement to the air gap 316 between the two electrodes 312 and 314 at the equilibrium, i.e., $\beta=x/d_e$. As a result, the sound pressure applied on the movable electrode 314 is directly proportional to the signal. In other words, the sound pressure and the signal assume a linear relationship.

In a real situation, the MEMS microphone system 300 may include a parasitic capacitance 320, resulting in two constituent parts of nonlinear transduction: one part is generated during pressure to displacement transduction and the other part is generated during displacement to voltage transduction. The nonlinearity in the signal may be due to, e.g., a high amplitude of the sound pressure resulting in parasitic capacitance values that distort the signal that is output by the MEMS microphone 300. The relationship between the signal and the normalized displacement of the movable electrode 314 takes the following form:

$$v=-\frac{\beta V_b}{1+\alpha(1-\beta)}, \tag{2}$$

where α is the capacitance ratio of the parasitic capacitance 320 to the active capacitance 310, i.e., $\alpha=C_p/C_e$. It can be observed from Eq. 2 that the linear relationship between p and v in the ideal microphone system does not hold, and the MEMS microphone 300 becomes a nonlinear microphone system.

In order to restore the linear relationship between the sound pressure and the signal, the MEMS microphone system 300 should account for the parasitic capacitance and may provide a nonlinear distortion compensation to the signal. The compensation may include two parts that compensate each of the two constituent parts of nonlinear transduction, i.e., compensating the nonlinearity due to pressure-to-displacement transduction and nonlinearity due to displacement-to-voltage transduction. In some embodiments, inverse nonlinear dynamics can be used to calculate parameters that are associated with the input of the sound pressure. The parameters may be associated with the displacement of the movable electrode 314 under the sound pressure. For example, based on Eq. 2, the normalized displacement can be determined using the signal, the value of the bias voltage 330, and the value of the capacitance ratio α. The normalized displacement can be calculated in the following equation:

$$\beta=-\frac{v(1+\alpha)}{v\alpha-V_b}, \tag{3}$$

With the calculated normalized displacement, the sound pressure can be estimated via the following equation:

$$p=\frac{1}{A}(Z(s)\beta d_e-F(\beta)), \tag{4}$$

wherein A is an area of the movable electrode 314, Z(s) is an impedance in the active capacitance 310, and F(β) is an electrostatic force in the active capacitance 310. Eq. 3 is used to estimate the nonlinearity due to displacement-to-voltage transduction and Eq. 4 is used to estimate the nonlinearity due to pressure-to-displacement transduction. Based on the calculated normalized displacement and the sound pressure, an output signal v' that has a linear relationship with the estimated sound pressure can be calculated. A linear dynamics model is cascaded and produces a linear output signal for the MEMS microphone system 300. The linear dynamics model is used to characterize the linear part of the system and excludes the nonlinear parts. For example, the output signal may be calculated by multiplying the sound pressure with a transfer function TF, which can be presented in the following manner:

$$TF=-\frac{AV_b}{(1+\alpha)d_e}\frac{1}{Z(s)}, \tag{5}$$

$$v'=p\times TF, \tag{6}$$

Based on the calculated output signal v', the signal can be compensated so that the compensated signal has the linear relationship with the input pressure. The MEMS microphone system 300 may output the compensated signal as an output corresponding to the input pressure.

In some embodiments, the compensation process can be simplified by only compensating the nonlinearity between the microphone membrane displacement and the output signal, i.e., nonlinearity due to displacement-to-voltage transduction. The normalized displacement may be directly input into the linear dynamics model to obtain the output signal. For example, the output signal may be calculated by multiplying β with a different transfer function TF', which can be presented in the following manner:

$$TF'=\frac{V_b}{1+\alpha}, \tag{7}$$

$$v'=\beta\times TF', \tag{8}$$

Figure 4:
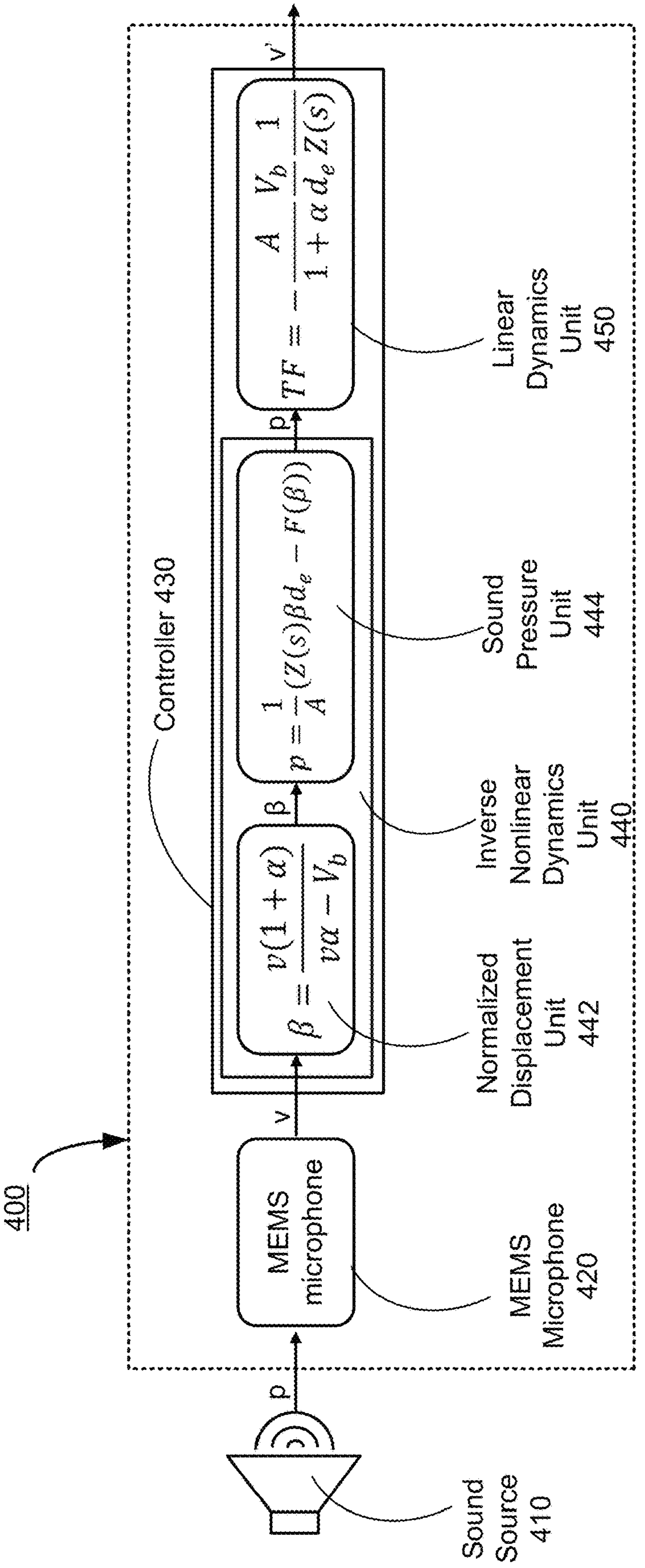
FIG. 4 is a block diagram of an audio system performing a nonlinear compensation to an output of a MEMS microphone, in accordance with one or more embodiments.

FIG. 4 is a block diagram of an audio system 400 performing nonlinear compensation, in accordance with one or more embodiments. The audio system 400 may be an embodiment of the audio system 200. The audio system 400 may be a nonlinear distortion compensation system that is configured to compensate a signal so that the output signal can have a linear relationship with the sound pressure. The audio system 400 may include a MEMS microphone 420 and a controller 430. Alternatively, the audio system 400 may include some or all components shown in FIG. 4. In some embodiments, the audio system 400 may further include a sound source 410 that generates sound pressure. For example, the sound source 410 may include a speaker, a transducer (e.g., transducer array 210), an external device, etc. In other embodiments not shown in FIG. 4 the audio system 400 may include different and/or additional components.

The MEMS microphone 420 is configured to receive a sound pressure and produces a signal. The MEMS microphone 420 is a capacitive MEMS microphone. In some embodiments, the MEMS microphone 420 includes an active capacitance and a parasitic capacitance. In some embodiments, the MEMS microphone 420 is a MEMS transducer and integrated with the controller 430.

The controller 430 (e.g., audio controller 230) is configured to receive the signal and outputs a compensated signal. In some embodiments, the controller 430 may determine whether there is nonlinear relationship exists between the received signal and the input sound pressure. For example, the controller 430 may determine the sound level of the signal, and if the sound level is higher than a threshold value, the controller 430 may determine that a nonlinear relationship exists and compensates the linearity of the signal. The threshold value may be determined based on the physical parameters of the MEMS microphone 420. In one example, the threshold value of the sound level may be 120 dB. If the controller 430 determines that there is no nonlinear distortion, the received signal may be directly output as an output without compensation.

The controller 430 comprises a nonlinear compensation module (e.g., nonlinear compensation module 290). The nonlinear compensation module further includes an inverse nonlinear dynamics unit 440 and a linear dynamics unit 450. The inverse nonlinear dynamics unit 440 may be configured to estimate the distortion produced during transduction, for example, by calculating parameters that are associated with the input of the sound pressure. As shown in FIG. 4, the inverse nonlinear dynamics unit 440 includes a normalized displacement unit 442 and a sound pressure unit 444. The normalized displacement unit 442 is configured to determine the normalized displacement, which is associated with the nonlinearity due to displacement-to-voltage transduction. The sound pressure unit 444 is configured to determine the input sound pressure, which is associated with the nonlinearity due to pressure-to-displacement transduction. The determinations at the normalized displacement unit 442 and the sound pressure unit 444 are represented with the functions in Eq. 3 and Eq. 4, respectively. The determined sound pressure is input into the linear dynamics unit 450, which uses a linear dynamics model to determine a linear output signal for the MEMS microphone 420. The linear dynamics model applied at the linear dynamics unit 450 is represented with the functions in Eq. 5 and Eq. 6. The audio system 400 outputs a compensated signal as an output corresponding to the input sound pressure that is produced by the sound source 410. The compensated signal and the input sound pressure have a linear relationship. In some embodiments, the audio system 400 may further includes a speaker for outputting the compensated signal as the output.

Figure 5:
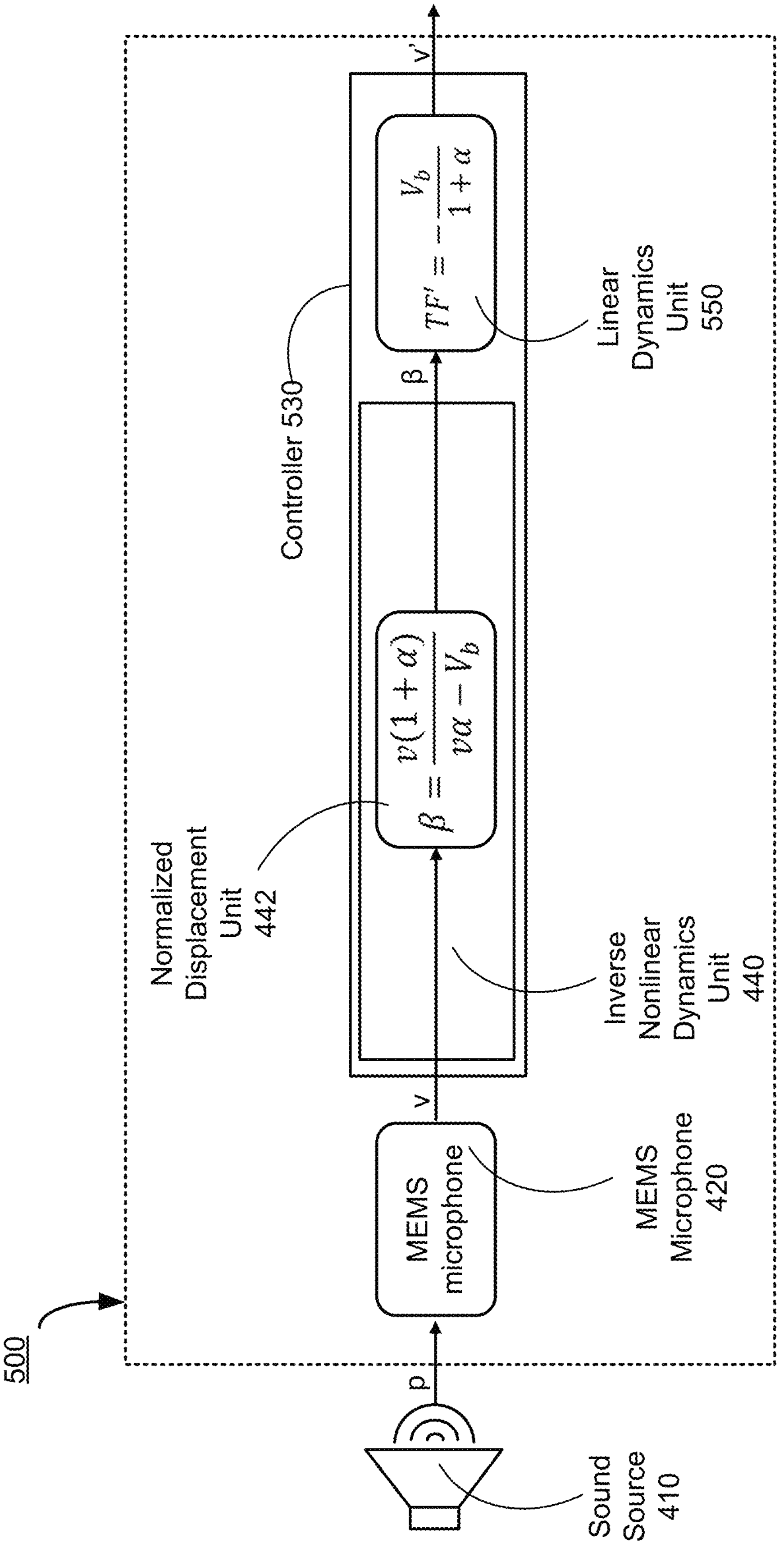
FIG. 5 is a block diagram of another audio system performing a nonlinear compensation to an output of a MEMS microphone, in accordance with one or more embodiments.

FIG. 5 is a block diagram of another audio system 500 performing a nonlinear compensation to an output of a MEMS microphone (e.g., as defined by Eq. 3, Eq. 7, and Eq. 8), in accordance with one or more embodiments. The audio system 500 is similar to the audio system 400. But the inverse nonlinear dynamics unit 530 of the system 500 only includes a normalized displacement unit 442. The inverse nonlinear dynamics process in the system 500 is by only considering the nonlinearity between the microphone membrane displacement and the output signal, i.e., nonlinearity due to displacement-to-voltage transduction. The determinations at the normalized displacement unit 442 is represented with the functions in Eq. 3. The determined normalized displacement is output from the inverse nonlinear dynamics unit 530 and input into the linear dynamics unit 550. The linear dynamics model applied at the linear dynamics unit 450 is represented with the functions in Eq. 7 and Eq. 8. The audio system 500 outputs a compensated signal as an output corresponding to the input sound pressure that is produced by the sound source 410. The compensated signal and the input sound pressure have a linear relationship. In some embodiments, the audio system 500 may further includes a speaker for outputting the compensated signal as the output.

Figure 6:
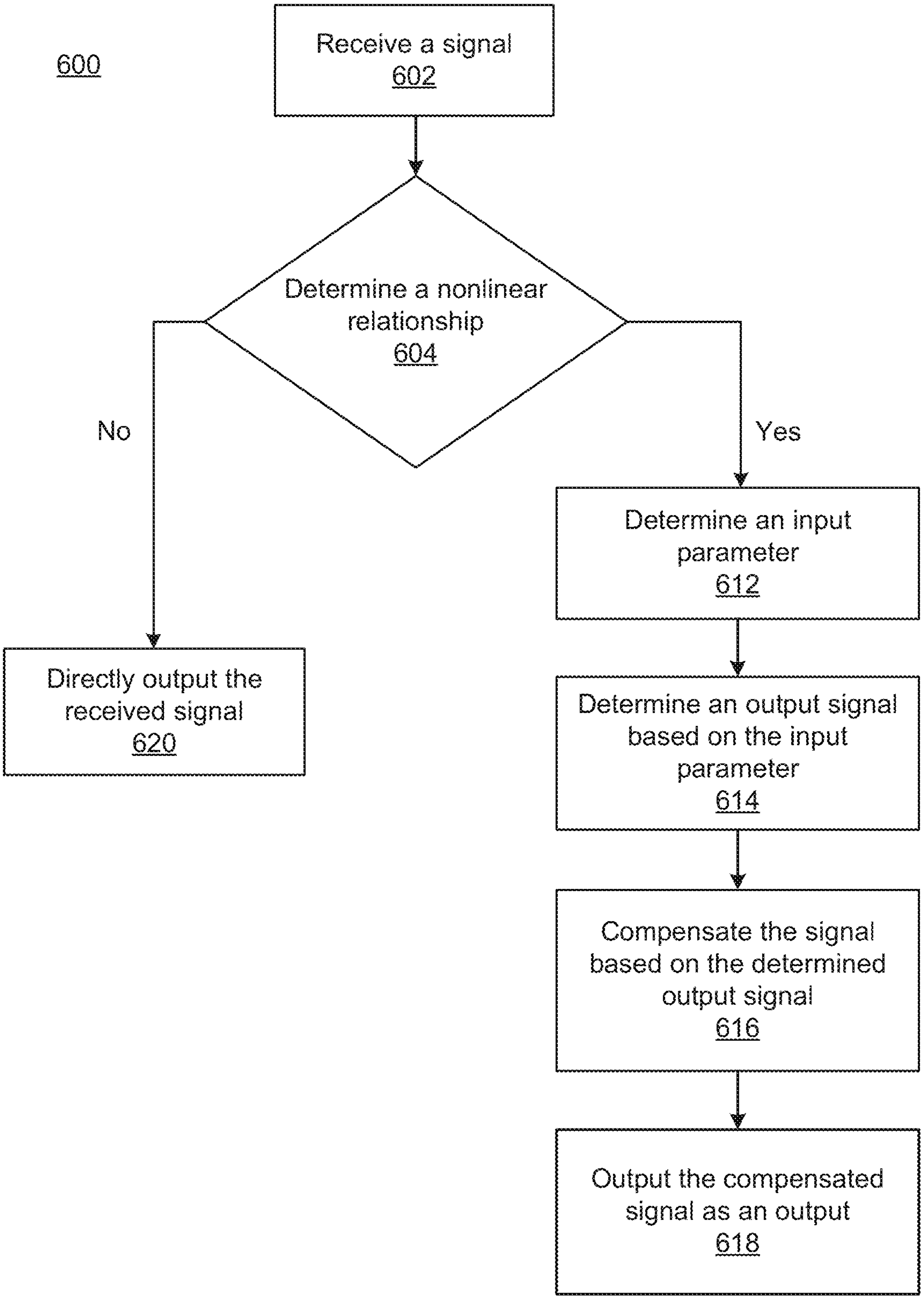
FIG. 6 is a flowchart of a nonlinear distortion compensation process, in accordance with one or more embodiments.

FIG. 6 is a flowchart of a nonlinear distortion compensation process 600, in accordance with one or more embodiments. The process shown in FIG. 6 may be performed by components of an audio system (e.g., audio controller 230 of the audio system 200). Other entities may perform some or all of the steps in FIG. 6 in other embodiments. Embodiments may include different and/or additional steps, or perform the steps in different orders.

The audio system receives 602 a signal corresponding to an input sound pressure. The audio system includes a capacitive MEMS microphone that detects the sound pressure, and the sound pressure may be generated by a sound source. The MEMS microphone produces a signal corresponding to the sound pressure.

The audio system determines 604 whether a nonlinear relationship exists between the signal and the input sound pressure. They audio system may include a controller to determine the nonlinear relationship based on the sound level of the signal. The controller may compare the determined sound level of the signal to a threshold value. If the sound level is not higher than the threshold value, the signal may be directly output 620 as an output without compensation. Alternatively, if the sound level of the received signal is higher than the threshold value, the controller may determine that a nonlinear relationship exists, and the audio system proceeds to perform a nonlinear distortion compensation to the received signal.

The audio system determines 612 an input parameter associated with the active capacitance and the parasitic capacitance based on the received signal. The input parameter may include, for example, the displacement of the movable electrode under the sound pressure. The controller of the audio system determines the normalized displacement, which is associated with the nonlinearity due to displacement-to-voltage transduction. In some embodiments, the controller may further determine the sound pressure which is associated with the nonlinearity due to pressure-to-displacement transduction based on the determined input parameter (e.g., normalized displacement).

The audio system determines 614, based on the determined input parameter, an output signal that has a linear relationship with the sound pressure. The controller of the audio system applies a linear dynamics model to calculate the output signal.

The audio system 616 then compensates the received signal based on the determined output signal so that the compensated signal has the linear relationship with the input sound pressure. In this way, the audio system compensates the nonlinear distortions in the detected signals.

The audio system outputs 618 the compensated signal as an output corresponding to the input sound pressure. In some embodiments, the audio system includes a speaker, and the compensated signal is output by the speaker.

Figure 7:
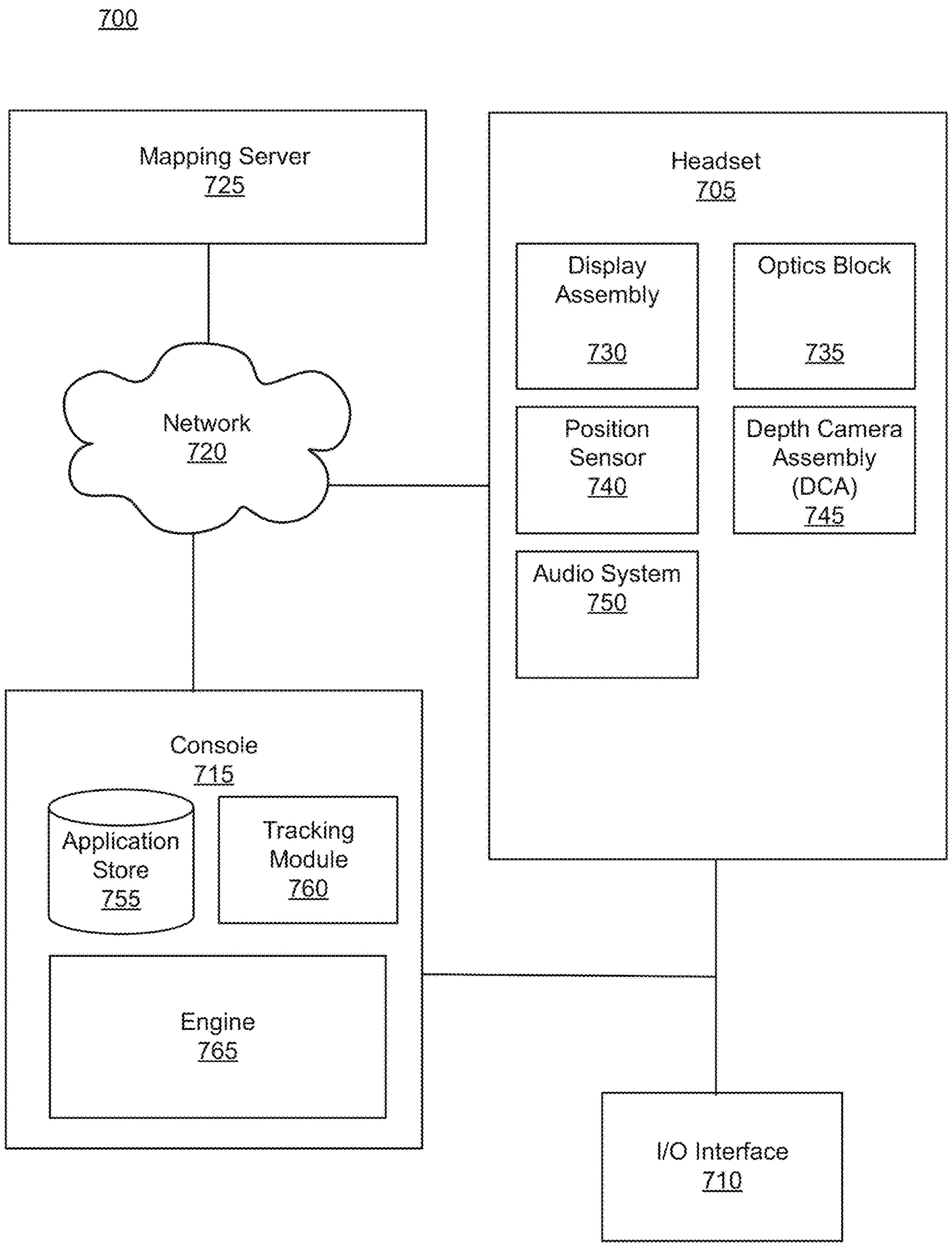
FIG. 7 is a system that includes a headset, in accordance with one or more embodiments.

FIG. 7 is a system 700 that includes a headset 705, in accordance with one or more embodiments. In some embodiments, the headset 705 may be the headset 100 of FIG. 1A or the headset 105 of FIG. 1B. The system 700 may operate in an artificial reality environment (e.g., a virtual reality environment, an augmented reality environment, a mixed reality environment, or some combination thereof). The system 700 shown by FIG. 7 includes the headset 705, an input/output (I/O) interface 710 that is coupled to a console 715, the network 720, and the mapping server 725.

While FIG. 7 shows an example system 700 including one headset 705 and one I/O interface 710, in other embodiments any number of these components may be included in the system 700. For example, there may be multiple headsets each having an associated I/O interface 710, with each headset and I/O interface 710 communicating with the console 715. In alternative configurations, different and/or additional components may be included in the system 700. Additionally, functionality described in conjunction with one or more of the components shown in FIG. 7 may be distributed among the components in a different manner than described in conjunction with FIG. 7 in some embodiments. For example, some or all of the functionality of the console 715 may be provided by the headset 705.

The headset 705 includes the display assembly 730, an optics block 735, one or more position sensors 740, and the DCA 745. Some embodiments of headset 705 have different components than those described in conjunction with FIG. 7. Additionally, the functionality provided by various components described in conjunction with FIG. 7 may be differently distributed among the components of the headset 705 in other embodiments or be captured in separate assemblies remote from the headset 705.

The display assembly 730 displays content to the user in accordance with data received from the console 715. The display assembly 730 displays the content using one or more display elements (e.g., the display elements 120). A display element may be, e.g., an electronic display. In various embodiments, the display assembly 730 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 735.

The optics block 735 may magnify image light received from the electronic display, corrects optical errors associated with the image light, and presents the corrected image light to one or both eyeboxes of the headset 705. In various embodiments, the optics block 735 includes one or more optical elements. Example optical elements included in the optics block 735 include: an aperture, a Fresnel lens, a convex lens, a concave lens, a filter, a reflecting surface, or any other suitable optical element that affects image light. Moreover, the optics block 735 may include combinations of different optical elements. In some embodiments, one or more of the optical elements in the optics block 735 may have one or more coatings, such as partially reflective or anti-reflective coatings.

Magnification and focusing of the image light by the optics block 735 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 735 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 735 corrects the distortion when it receives image light from the electronic display generated based on the content.

The position sensor 740 is an electronic device that generates data indicating a position of the headset 705. The position sensor 740 generates one or more measurement signals in response to motion of the headset 705. The position sensor 190 is an embodiment of the position sensor 740. Examples of a position sensor 740 include: one or more IMUs, one or more accelerometers, one or more gyroscopes, one or more magnetometers, another suitable type of sensor that detects motion, or some combination thereof. The position sensor 740 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 705 from the sampled data. For example, the IMU integrates the measurement signals received from the accelerometers over time to estimate a velocity vector and integrates the velocity vector over time to determine an estimated position of a reference point on the headset 705. The reference point is a point that may be used to describe the position of the headset 705. While the reference point may generally be defined as a point in space, however, in practice the reference point is defined as a point within the headset 705.

The DCA 745 generates depth information for a portion of the local area. The DCA includes one or more imaging devices and a DCA controller. The DCA 745 may also include an illuminator. Operation and structure of the DCA 745 is described above with regard to FIG. 1A.

The audio system 750 provides audio content to a user of the headset 705. The audio system 750 is substantially the same as the audio system 200 describe above. The audio system 750 may comprise one or acoustic sensors, one or more transducers, and an audio controller. The audio system 750 may provide spatialized audio content to the user. In some embodiments, the audio system 750 may request acoustic parameters from the mapping server 725 over the network 720. The acoustic parameters describe one or more acoustic properties (e.g., room impulse response, a reverberation time, a reverberation level, etc.) of the local area. The audio system 750 may provide information describing at least a portion of the local area from e.g., the DCA 745 and/or location information for the headset 705 from the position sensor 740. The audio system 750 may generate one or more sound filters using one or more of the acoustic parameters received from the mapping server 725 and use the sound filters to provide audio content to the user. The audio system 750 applies nonlinear distortion compensation for high AOP microphones. The audio system 750 determines a received signal that has a nonlinear relationship with the input acoustic pressure and compensates the received signal for the nonlinearity introduced.

The I/O interface 710 is a device that allows a user to send action requests and receive responses from the console 715. An action request is a request to perform a particular action. For example, an action request may be an instruction to start or end capture of image or video data, or an instruction to perform a particular action within an application. The I/O interface 710 may include one or more input devices.

Example input devices include: a keyboard, a mouse, a game controller, or any other suitable device for receiving action requests and communicating the action requests to the console 715. An action request received by the I/O interface 710 is communicated to the console 715, which performs an action corresponding to the action request. In some embodiments, the I/O interface 710 includes an IMU that captures calibration data indicating an estimated position of the I/O interface 710 relative to an initial position of the I/O interface 710. In some embodiments, the I/O interface 710 may provide haptic feedback to the user in accordance with instructions received from the console 715. For example, haptic feedback is provided when an action request is received, or the console 715 communicates instructions to the I/O interface 710 causing the I/O interface 710 to generate haptic feedback when the console 715 performs an action.

The console 715 provides content to the headset 705 for processing in accordance with information received from one or more of: the DCA 745, the headset 705, and the I/O interface 710. In the example shown in FIG. 7, the console 715 includes an application store 755, a tracking module 760, and an engine 765. Some embodiments of the console 715 have different modules or components than those described in conjunction with FIG. 7. Similarly, the functions further described below may be distributed among components of the console 715 in a different manner than described in conjunction with FIG. 7. In some embodiments, the functionality discussed herein with respect to the console 715 may be implemented in the headset 705, or a remote system.

The application store 755 stores one or more applications for execution by the console 715. An application is a group of instructions, that when executed by a processor, generates content for presentation to the user. Content generated by an application may be in response to inputs received from the user via movement of the headset 705 or the I/O interface 710. Examples of applications include: gaming applications, conferencing applications, video playback applications, or other suitable applications.

The tracking module 760 tracks movements of the headset 705 or of the I/O interface 710 using information from the DCA 745, the one or more position sensors 740, or some combination thereof. For example, the tracking module 760 determines a position of a reference point of the headset 705 in a mapping of a local area based on information from the headset 705. The tracking module 760 may also determine positions of an object or virtual object. Additionally, in some embodiments, the tracking module 760 may use portions of data indicating a position of the headset 705 from the position sensor 740 as well as representations of the local area from the DCA 745 to predict a future location of the headset 705. The tracking module 760 provides the estimated or predicted future position of the headset 705 or the I/O interface 710 to the engine 765.

The engine 765 executes applications and receives position information, acceleration information, velocity information, predicted future positions, or some combination thereof, of the headset 705 from the tracking module 760. Based on the received information, the engine 765 determines content to provide to the headset 705 for presentation to the user. For example, if the received information indicates that the user has looked to the left, the engine 765 generates content for the headset 705 that mirrors the user's movement in a virtual local area or in a local area augmenting the local area with additional content. Additionally, the engine 765 performs an action within an application executing on the console 715 in response to an action request received from the I/O interface 710 and provides feedback to the user that the action was performed. The provided feedback may be visual or audible feedback via the headset 705 or haptic feedback via the I/O interface 710.

The network 720 couples the headset 705 and/or the console 715 to the mapping server 725. The network 720 may include any combination of local area and/or wide area networks using both wireless and/or wired communication systems. For example, the network 720 may include the Internet, as well as mobile telephone networks. In one embodiment, the network 720 uses standard communications technologies and/or protocols. Hence, the network 720 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 720 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 720 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 725 may include a database that stores a virtual model describing a plurality of spaces, wherein one location in the virtual model corresponds to a current configuration of a local area of the headset 705. The mapping server 725 receives, from the headset 705 via the network 720, information describing at least a portion of the local area and/or location information for the local area. The user may adjust privacy settings to allow or prevent the headset 705 from transmitting information to the mapping server 725. The mapping server 725 determines, based on the received information and/or location information, a location in the virtual model that is associated with the local area of the headset 705. The mapping server 725 determines (e.g., retrieves) one or more acoustic parameters associated with the local area, based in part on the determined location in the virtual model and any acoustic parameters associated with the determined location. The mapping server 725 may transmit the location of the local area and any values of acoustic parameters associated with the local area to the headset 705.

One or more components of system 700 may contain a privacy module that stores one or more privacy settings for user data elements. The user data elements describe the user or the headset 705. For example, the user data elements may describe a physical characteristic of the user, an action performed by the user, a location of the user of the headset 705, a location of the headset 705, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 700 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

receiving a signal corresponding to an input sound pressure detected by a capacitive microelectromechanical system (MEMS) microphone, wherein the capacitive MEMS microphone includes an active capacitance and a parasitic capacitance;

determining that a nonlinear relationship exists between the signal and the input sound pressure;

determining, based on the signal, an input parameter associated with the active capacitance and the parasitic capacitance;

determining an output signal based on the input parameter, wherein the output signal and the input sound pressure have a linear relationship;

compensating the signal based on the determined output signal so that the compensated signal has the linear relationship with the input sound pressure; and outputting the compensated signal as an output corresponding to the input sound pressure.

2. The method of claim 1, wherein determining that the nonlinear relationship exists between the signal and the input sound pressure comprises:

determining a sound level of the signal; and responsive to the determined sound level being higher than a threshold value, determining that the nonlinear relationship exists between the signal and the input sound pressure.

3. The method of claim 1, wherein the input parameter is a normalized displacement (B) of a movable electrode in the active capacitance corresponding to the input sound pressure.

4. The method of claim 3, wherein $$\beta = -\frac{v(1+\alpha)}{v\alpha - V_b},$$

and $\alpha = C_p/C_e$, $C_p$ is the parasitic capacitance, $C_e$ is the active capacitance; and $V_b$ is a bias voltage on $C_e$.

5. The method of claim 4, wherein determining the output signal based on the input parameter comprises:

estimating the input sound pressure (p) based on the normalized displacement (β); and determining the output signal by multiplying p by a transfer function (TF).

6. The method of claim 5, wherein $$p = \frac{1}{A}(Z(s)\beta d_e - F(\beta)),$$

and

A is an area of the movable electrode,

Z(s) is an impedance in the active capacitance, $d_e$ is a distance between a backplate and the movable electrode in the active capacitance at equilibrium, and F(β) is an electrostatic force in the active capacitance.

7. The method of claim 5, wherein $$TF = -\frac{AV_b}{(1+\alpha)d_e}\frac{1}{Z(s)},$$

and

A is an area of the movable electrode,

Z(s) is an impedance in the active capacitance, $d_e$ is a distance between a backplate and the movable electrode in the active capacitance at equilibrium, and F(β) is an electrostatic force in the active capacitance.

8. The method of claim 4, wherein determining the output signal based on the input parameter comprises: multiplying β by a transfer function (TF') to obtain the output signal, wherein $$TF' = \frac{V_b}{1+\alpha}.$$

9. A non-transitory computer-readable storage medium comprising stored instructions, the instructions when executed by a processor of a device, causing the device to:

receive a signal corresponding to an input sound pressure detected by a capacitive microelectromechanical system (MEMS) microphone, wherein the capacitive MEMS microphone includes an active capacitance and a parasitic capacitance;

determine that a nonlinear relationship exists between the signal and the input sound pressure;

determine, based on the signal, an input parameter associated with the active capacitance and the parasitic capacitance;

determine an output signal based on the input parameter, wherein the output signal and the input sound pressure have a linear relationship;

compensate the signal based on the determined output signal so that the compensated signal has the linear relationship with the input sound pressure; and output the compensated signal as an output corresponding to the input sound pressure.

10. The non-transitory computer-readable storage medium of claim 9, wherein the instruction to determine that the nonlinear relationship exists between the signal and the input sound pressure comprises:

determining a sound level of the signal; and responsive to the determined sound level being higher than a threshold value, determining that the nonlinear relationship exists between the signal and the input sound pressure.

11. The non-transitory computer-readable storage medium of claim 9, wherein the input parameter is a normalized displacement (β) of a movable electrode in the active capacitance corresponding to the input sound pressure, $$\beta = -\frac{V(1+\alpha)}{v\alpha - V_b},$$

and $\alpha = C_p/C_e$, $C_p$ is the parasitic capacitance, $C_e$ is the active capacitance; and $V_b$ is a bias voltage on $C_e$.

12. The non-transitory computer-readable storage medium of claim 11, wherein the instruction to determine the output signal based on the input parameter comprises:

estimating the input sound pressure (p) based on the normalized displacement (β); and determining the output signal by multiplying p by a transfer function (TF).

13. The non-transitory computer-readable storage medium of claim 12, wherein $$p = \frac{1}{A}(Z(s)\beta d_e - F(\beta)),$$

and

A is an area of the movable electrode,

Z(s) is an impedance in the active capacitance, $d_e$ is a distance between a backplate and the movable electrode in the active capacitance at equilibrium, and F(β) is an electrostatic force in the active capacitance.

14. The non-transitory computer-readable storage medium of claim 12, wherein $$TF = -\frac{AV_b}{(1+\alpha)d_e}\frac{1}{Z(s)},$$

and

A is an area of the movable electrode,

Z(s) is an impedance in the active capacitance, $d_e$ is a distance between a backplate and the movable electrode in the active capacitance at equilibrium, and F(β) is an electrostatic force in the active capacitance.

15. The non-transitory computer-readable storage medium of claim 11, wherein the instruction to determine the output signal based on the input parameter comprises:

multiplying β by a transfer function (TF') to obtain the output signal, wherein $$TF' = \frac{V_b}{1+\alpha}.$$

16. An audio system comprising:

a capacitive microelectromechanical system (MEMS) microphone configured to receive a signal corresponding to an input sound pressure, wherein the capacitive MEMS microphone includes an active capacitance and a parasitic capacitance;

a controller configured to:

determine that a nonlinear relationship exists between the signal and the input sound pressure;

determine, based on the signal, a normalized displacement (B) of a movable electrode in the active capacitance corresponding to the input sound pressure;

determine an output signal based on the normalized displacement, wherein the output signal and the input sound pressure have a linear relationship; and compensate the signal based on the determined output signal so that the compensated signal has the linear relationship with the input sound pressure; and a speaker configured to output the compensated signal as a sound output corresponding to the input sound pressure.

17. The system of claim 16, wherein the controller is further configured to:

estimate the input sound pressure (p) based on the normalized displacement (β); and determine the output signal by multiplying p by a transfer function (TF).

18. The system of claim 16, wherein the controller is further configured to multiply β by a transfer function (TF') to obtain the output signal.

19. The system of claim 16, wherein the MEMS microphone includes a MEMS transducer.

20. The system of claim 16, wherein the controller is configured to:

determine a sound level of the signal; and responsive to the determined sound level being higher than a threshold value, determine that the nonlinear relationship exists between the signal and the input sound pressure.

* * * * *